(No Model.)

M. FOWLER.
ANIMAL TRAP.

No. 441,755. Patented Dec. 2, 1890.

Witnesses
J. R. Shumway
Lillian D. Kelsey

Merwin Fowler
Inventor
By atty.
Earle Seymour

UNITED STATES PATENT OFFICE.

MERWIN FOWLER, OF DURHAM, ASSIGNOR OF ONE-HALF TO FREDERIC A. LANE, OF NEW HAVEN, CONNECTICUT.

ANIMAL-TRAP.

SPECIFICATION forming part of Letters Patent No. 441,755, dated December 2, 1890.

Application filed February 7, 1890. Serial No. 339,593. (No model.)

*To all whom it may concern:*

Be it known that I, MERWIN FOWLER, of Durham, in the county of Middlesex and State of Connecticut, have invented new Improvements in Animal-Traps; and I do hereby declare the following, when taken in connection with accompanying drawings and the letters of reference marked thereon, to be a full, clear, and exact description of the same, and which said drawings constitute part of this specification, and represent, in—

Figure 1:
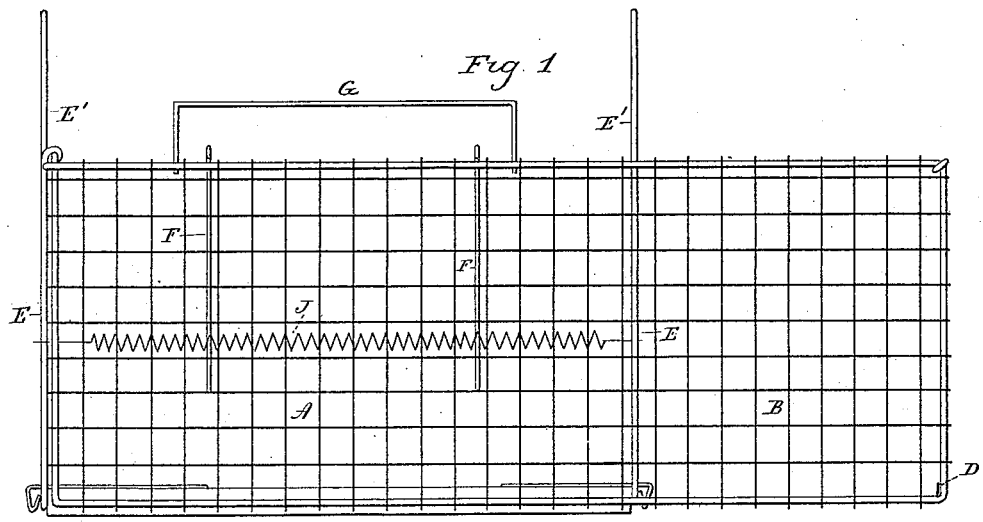
Figure 2:
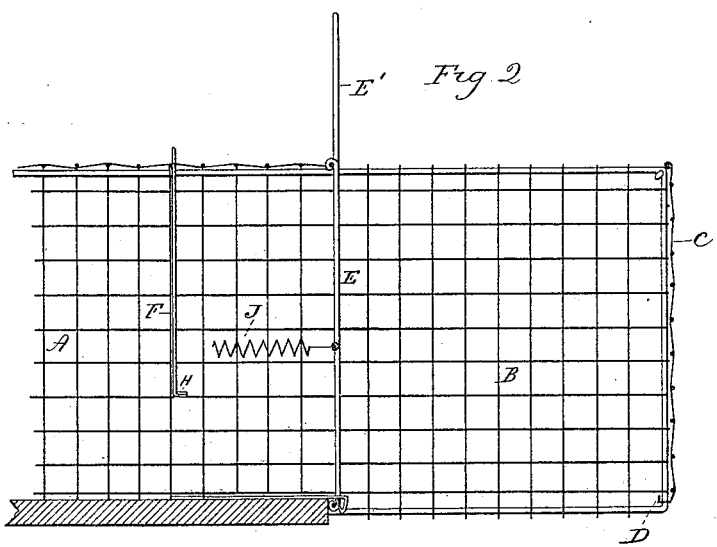
Figure 3:
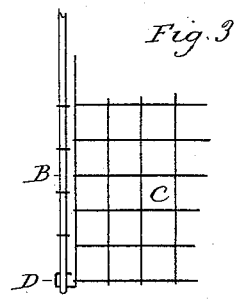
Figure 4:
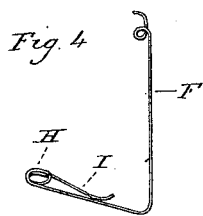

Figure 1, a view in side elevation of an animal-trap embodying my invention; Fig. 2, a view in vertical section showing the extension at one end of the trap; Fig. 3, a broken view in end elevation of the extension and showing the locking of the pivotal door thereof to the sides of the extension; Fig. 4, detached perspective view of the bait-carrier.

My invention relates to an improvement in animal-traps, the object being to make them more effective in use.

With this end in view my invention consists in a trap having one end provided with an extension or vestibule adapted to inclose a hole in a horizontal or in a vertical plane, in an improved bait-carrier, and in certain other details of construction, as will be hereinafter described, and pointed out in the claims.

As herein shown, the sides of the body A of an ordinary trap are extended at one end in straight parallel lines to form two prolongations B B, which are closed in at their outer ends by an outer door C, which is hung from its upper edge to the upper outer corners of the said extensions, its lower corners being provided with locking-ears D D, which are caught into the lower corners of the parts B B, for securing it in its closed position. The extension or vestibule thus formed is open at the top and bottom, and adapted to give clearance to and to be closed at the top by the adjacent trap-door E, which has an upwardly-extending setting-finger E', and is duplicated at the opposite end of the trap. Although, as herein shown, the sides of the vestibule are made integral with the body of the trap, the vestibule may be made as an independent part and attached to traps already made. Nor is it necessary that the top of the vestibule should be open, although that construction is preferred. The open bottom of the vestibule adapts the trap to inclose and cover the hole—say a rat-hole—frequented by the animal which it is desired to catch when the hole is in the same level with the base of the trap. In case the hole is in a vertical or approximately vertical plane the outer door of the trap is lifted and swung over onto the top of the vestibule, leaving the end thereof open and adapting the trap to be set to inclose a hole in a vertical plane. It will thus be seen that the animal having once ventured out must either return into his hole or enter the vestibule and pass into the body of the trap with little chance of keeping his freedom, as will hereinafter appear.

The second part of my invention consists in a bait-carrier F, suspended by an eye F' from the top of the body of the trap, adapted by a finger F² to be hooked over a locking-bail G, under which the locking-fingers E' of the doors E are held when the trap is set and extended at its lower end transversely to the said body and provided with a spring-coil H and a retaining-finger I, the said carrier being formed from a single piece of wire. A spiral spring J, uniting the doors, pulls them down when the trap is sprung and holds them closed thereafter. By extending the bait-carrier transversely it so obstructs the open way through the trap that the animal is liable to run against it and so spring the trap, even if he does not meddle with the bait. The formation of a coil and finger at the lower end of the carrier enables the bait to be readily and securely attached thereto, and is more effective than the prong or hook now in use.

It is not essential that the vestibule be open at the bottom and adapted to be open at the end, although that construction is preferred, as it increases the range of situations in which the trap may be effectively used. I would therefore have it understood that I do not limit myself to the exact construction shown and described, but hold myself at liberty to make such changes and alterations from such form as fairly fall within the spirit and scope of my invention.

I claim—

1. An animal-trap having a door at each end and means for holding the said doors open when the trap is set, and provided at one end with an extension which the adjacent door swings into, and which is constructed to inclose a hole and cut off egress therefrom except through the trap, substantially as described.

2. An animal-trap having a door at each end and means for holding the said door open when the trap is set, and provided at one end with an extension which the adjacent trap-door swings into, and which is open at the bottom and closed elsewhere, so as to inclose a hole and prevent egress therefrom except through the trap, substantially as described.

3. An animal-trap provided beyond one of its doors with an extension constructed to be open at the bottom to inclose a hole in the same plane with the base of the trap and having its outer end formed by a hinged door adapted to be opened to permit the extension to inclose a hole in a vertical plane, substantially as described.

4. In an animal-trap, the combination, with the body thereof, of a bait-carrier made of a single piece of wire bent to form an eye and a finger at its upper end, and having its lower end bent at a right angle to its upper end to stand transversely across the body of the trap, and coiled and turned upwardly from the coil to form a retaining-finger for the bait, substantially as described.

MERWIN FOWLER.

Witnesses:
FRED C. EARLE,
GEO. D. SEYMOUR.